(12) United States Patent
Dudar

(10) Patent No.: US 10,371,102 B2
(45) Date of Patent: Aug. 6, 2019

(54) SYSTEMS AND METHODS FOR LIMITED EMISSIONS REFUELING

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 15/299,256

(22) Filed: Oct. 20, 2016

(65) Prior Publication Data
US 2017/0218885 A1 Aug. 3, 2017

Related U.S. Application Data

(63) Continuation-in-part of application No. 15/013,720, filed on Feb. 2, 2016.

(51) Int. Cl.
| | | |
|---|---|---|
| *F02D 41/00* | (2006.01) | |
| *F02M 25/08* | (2006.01) | |
| *G06Q 30/00* | (2012.01) | |
| *G06Q 50/06* | (2012.01) | |

(52) U.S. Cl.
CPC ..... *F02M 25/0809* (2013.01); *F02D 41/0042* (2013.01); *F02M 25/0836* (2013.01); *G06Q 30/018* (2013.01); *G06Q 50/06* (2013.01); *B01D 2257/7022* (2013.01); *B01D 2259/4516* (2013.01)

(58) Field of Classification Search
CPC ... B67D 7/048; B67D 7/0492; F02D 41/0045; F02M 25/0809
USPC ............................................................. 141/5
See application file for complete search history.

(56) References Cited

U.S. PATENT DOCUMENTS

| | | | | |
|---|---|---|---|---|
| 4,748,959 A | * | 6/1988 | Cook | F02D 37/02 123/406.45 |
| 5,069,188 A | * | 12/1991 | Cook | F02M 25/0836 123/516 |
| 5,199,404 A | * | 4/1993 | Cook | F02D 41/004 123/518 |
| 5,249,561 A | * | 10/1993 | Thompson | F02D 41/0032 123/494 |

(Continued)

OTHER PUBLICATIONS

Dudar, Aed M. et al., "System and Methods for Regulating Fuel Vapor Flow in a Fuel Vapor Recirculation Line," U.S. Appl. No. 14/825,067, filed Sep. 12, 2015, 61 pages.

(Continued)

*Primary Examiner* — Timothy L Maust
*Assistant Examiner* — James R Hakomaki
(74) *Attorney, Agent, or Firm* — Julia Voutyras; McCoy Russell LLP

(57) ABSTRACT

A method is presented, comprising, during a first condition, including an active refueling event, receiving an indication of hydrocarbon breakthrough from the fuel vapor canister; and flowing refueling vapors into an intake manifold responsive to the indication of hydrocarbon breakthrough. Flowing refueling vapors into an intake manifold traps the vapors there until engine start-up, when the vapor can be combusted by the engine. In this way, refueling emissions may be reduced, even if the fuel vapor canister is saturated prior to, or during the refueling event.

19 Claims, 6 Drawing Sheets

(56) References Cited

U.S. PATENT DOCUMENTS

| | | | | |
|---|---|---|---|---|
| 5,596,972 | A * | 1/1997 | Sultan | F02D 41/0045 123/520 |
| 5,944,044 | A * | 8/1999 | King | B60K 15/03519 137/202 |
| 6,293,261 | B1 | 9/2001 | Oemcke et al. | |
| 6,381,514 | B1 | 4/2002 | Hartsell, Jr. | |
| 6,537,354 | B2 * | 3/2003 | Meiller | F02M 25/0854 123/519 |
| 8,181,631 | B2 * | 5/2012 | Bohr | F02M 25/089 123/520 |
| 9,005,352 | B2 | 4/2015 | Mani et al. | |
| 9,026,292 | B2 | 5/2015 | Lindlbauer et al. | |
| 2003/0005916 | A1 * | 1/2003 | Osanai | F02D 41/0045 123/698 |
| 2009/0120063 | A1 * | 5/2009 | Uhrich | F01N 3/2832 60/278 |
| 2009/0120067 | A1 * | 5/2009 | Elwart | F01N 5/02 60/285 |
| 2010/0126477 | A1 * | 5/2010 | Reddy | F02M 25/0836 123/520 |
| 2010/0132676 | A1 * | 6/2010 | Kitamura | F02D 41/0045 123/520 |
| 2011/0162625 | A1 | 7/2011 | Espinoza | |
| 2014/0096750 | A1 * | 4/2014 | Pearce | F02M 25/0818 123/520 |
| 2014/0114550 | A1 * | 4/2014 | Bohr | F02D 41/0037 701/102 |
| 2014/0374177 | A1 * | 12/2014 | Yang | B60K 15/035 180/65.21 |
| 2015/0013437 | A1 * | 1/2015 | Takakura | F02M 25/0818 73/40.5 R |
| 2015/0090233 | A1 | 4/2015 | Dudar et al. | |
| 2015/0369150 | A1 | 12/2015 | Dudar | |

OTHER PUBLICATIONS

Dudar, Aed M., "System and Methods for Preventing Hydrocarbon Breakthrough Emissions," U.S. Appl. No. 14/860,421, filed Sep. 21, 2015, 51 pages.

* cited by examiner

SYSTEMS AND METHODS FOR LIMITED EMISSIONS REFUELING

CROSS REFERENCE TO RELATED APPLICATION

The present application is a continuation-in-part of U.S. patent application Ser. No. 15/013,720 entitled "Systems and Methods for Limited Emissions Refueling," filed on Feb. 2, 2016. The entire contents of the above-referenced application are hereby incorporated by reference in their entirety for all purposes.

FIELD

The present description relates generally to methods and systems for refueling a vehicle.

BACKGROUND/SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an activated carbon adsorbent which adsorbs and stores the vapors. At a later time, when the engine is in operation, the evaporative emission control system allows the vapors to be purged into the engine intake manifold for use as fuel.

Adsorption of fuel vapor to activated carbon is an exothermic reaction. A hot canister thus has a lower adsorption capacity than does a cool canister. In hot climates, and/or following a prolonged driving period, the canister temperature may become increased due to heat rejection from the engine, exhaust, asphalt radiation, etc. As such, the canister may be incapable of storing enough fuel vapor to accommodate a tank filling refueling event without emitting hydrocarbons into atmosphere.

Other attempts to address hydrocarbon breakthrough during refueling events include deposing a secondary or "trap" canister downstream of the primary fuel vapor canister in order to capture breakthrough hydrocarbons. One example approach is shown by Mani et al. in U.S. Pat. No. 9,005,352. Therein, a trap canister with a higher adsorbance than the main canister is selectively coupled to an outlet of the main canister within the fuel canister vent pathway.

However, the inventors herein have recognized potential issues with such systems. As one example, a trap canister must significantly restrict vapor flow in order to be effective. This may lead to prolonged fuel tank depressurization and may further limit the rate of refueling and the rate of purging the canisters. If the trap canister is bypassed, hydrocarbon breakthrough may occur.

In one example, the issues described above may be addressed by a method, comprising, during a first condition, including an active refueling event, receiving an indication of hydrocarbon breakthrough from the fuel vapor canister; and flowing refueling vapors into an intake manifold responsive to the indication of hydrocarbon breakthrough. Flowing refueling vapors into an intake manifold traps the vapors there until engine start-up, when the vapor can be combusted by the engine. In this way, refueling emissions may be reduced, even if the fuel vapor canister is saturated prior to, or during the refueling event.

As one example, a hydrocarbon sensor may be placed in the canister vent pathway to detect hydrocarbon breakthrough, a canister purge valve may be actuated to an open conformation to allow vapor flow to the engine intake. By diverting refueling vapors in this way, vehicles can obtain fuel without increasing surface hydrocarbon concentrations which may thus limit ground ozone levels on hot days.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
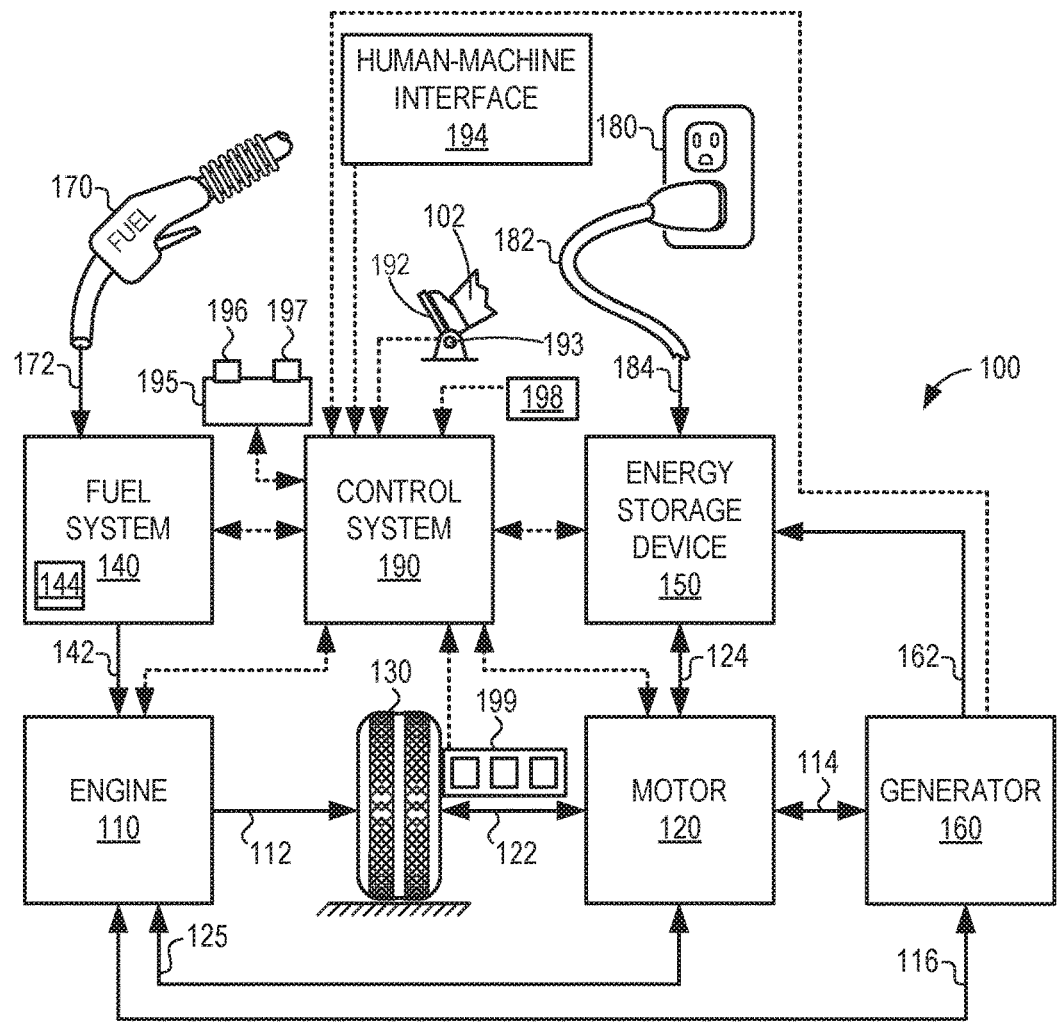
FIG. 1 schematically shows an example vehicle propulsion system.
Figure 2:
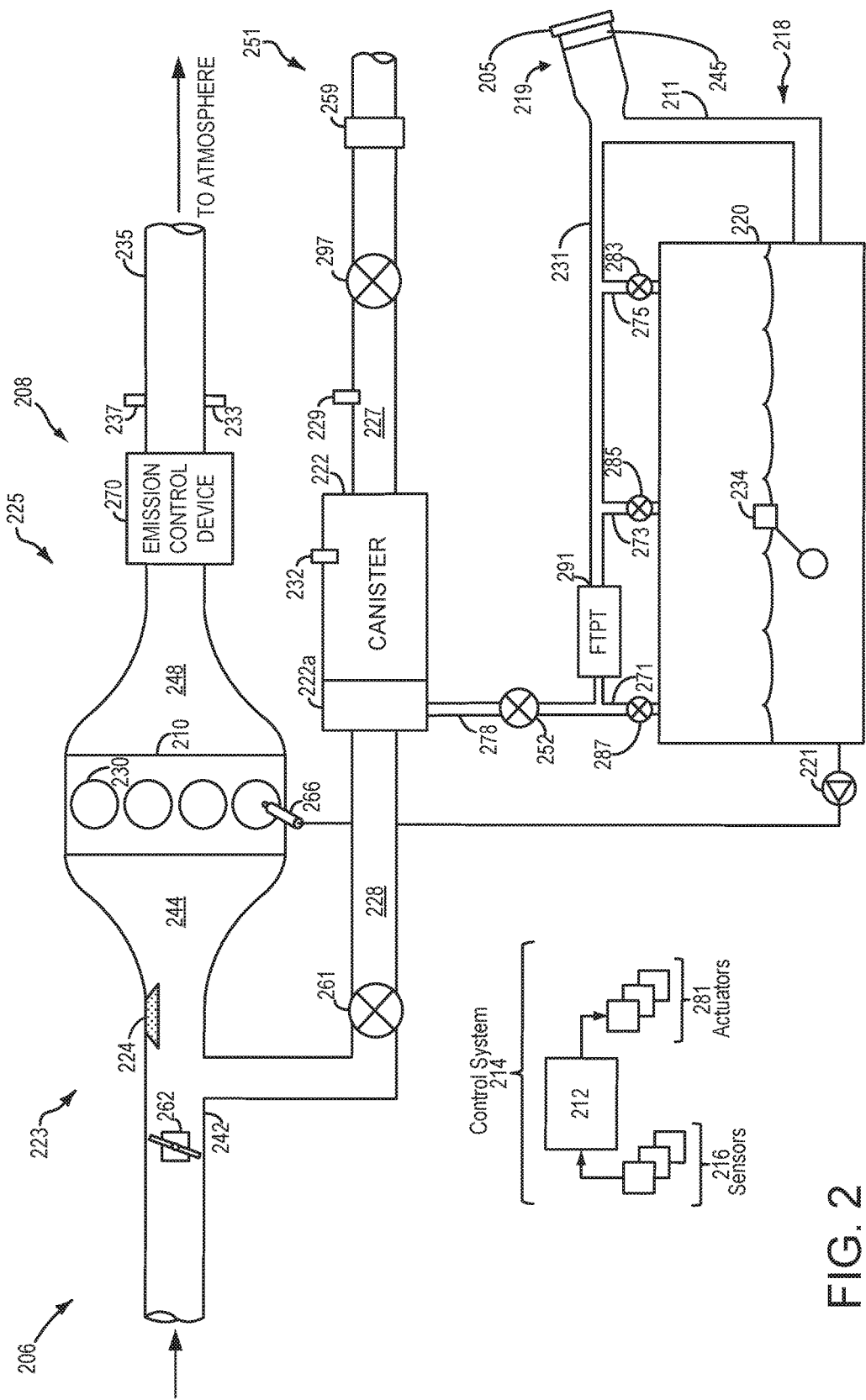
FIG. 2 schematically shows an example vehicle system comprising an engine system coupled to a fuel system and an evaporative emissions system.
Figure 4:
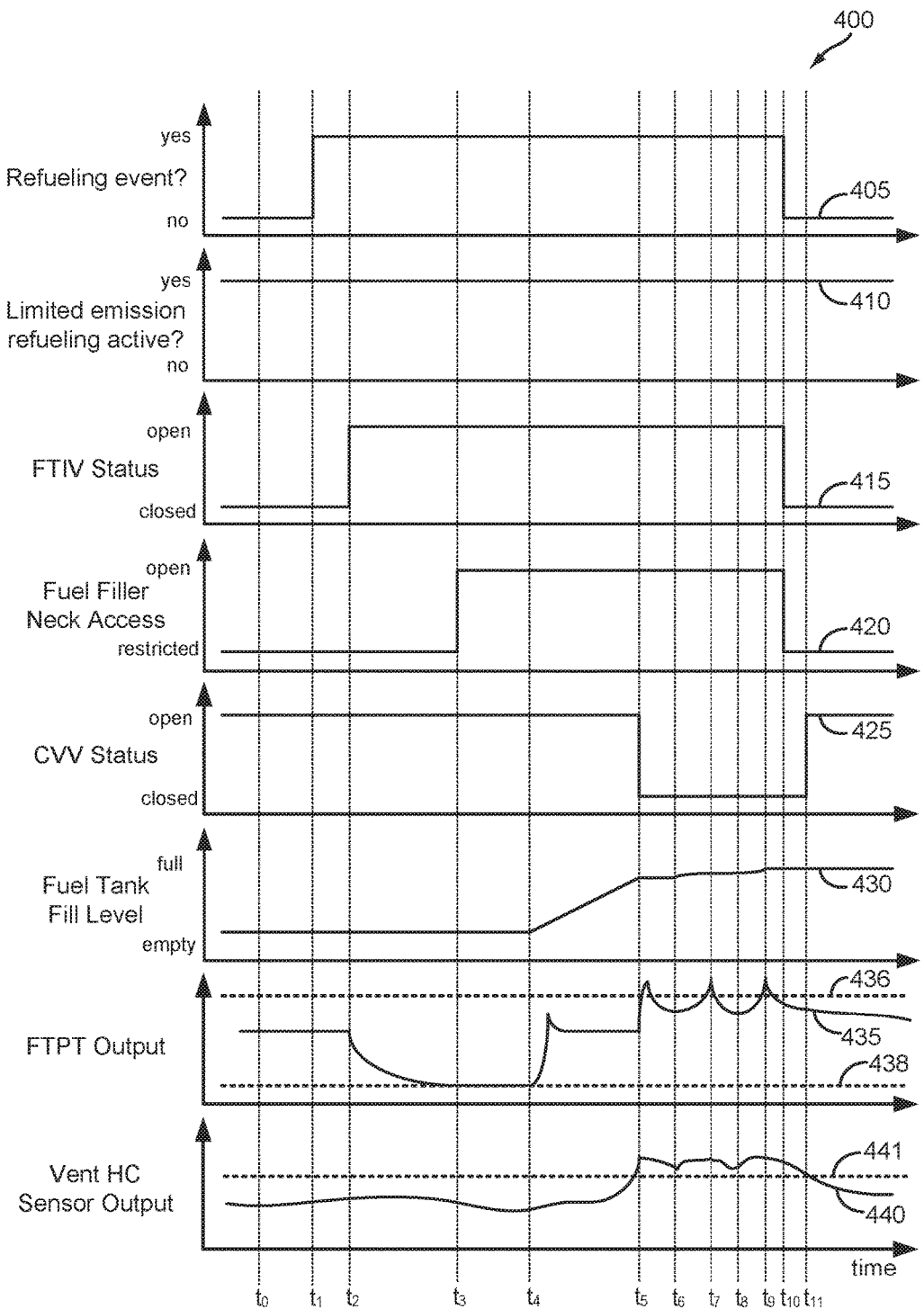
FIG. 4 shows a timeline for an example refueling event using the method of FIG. 3.
Figure 5:
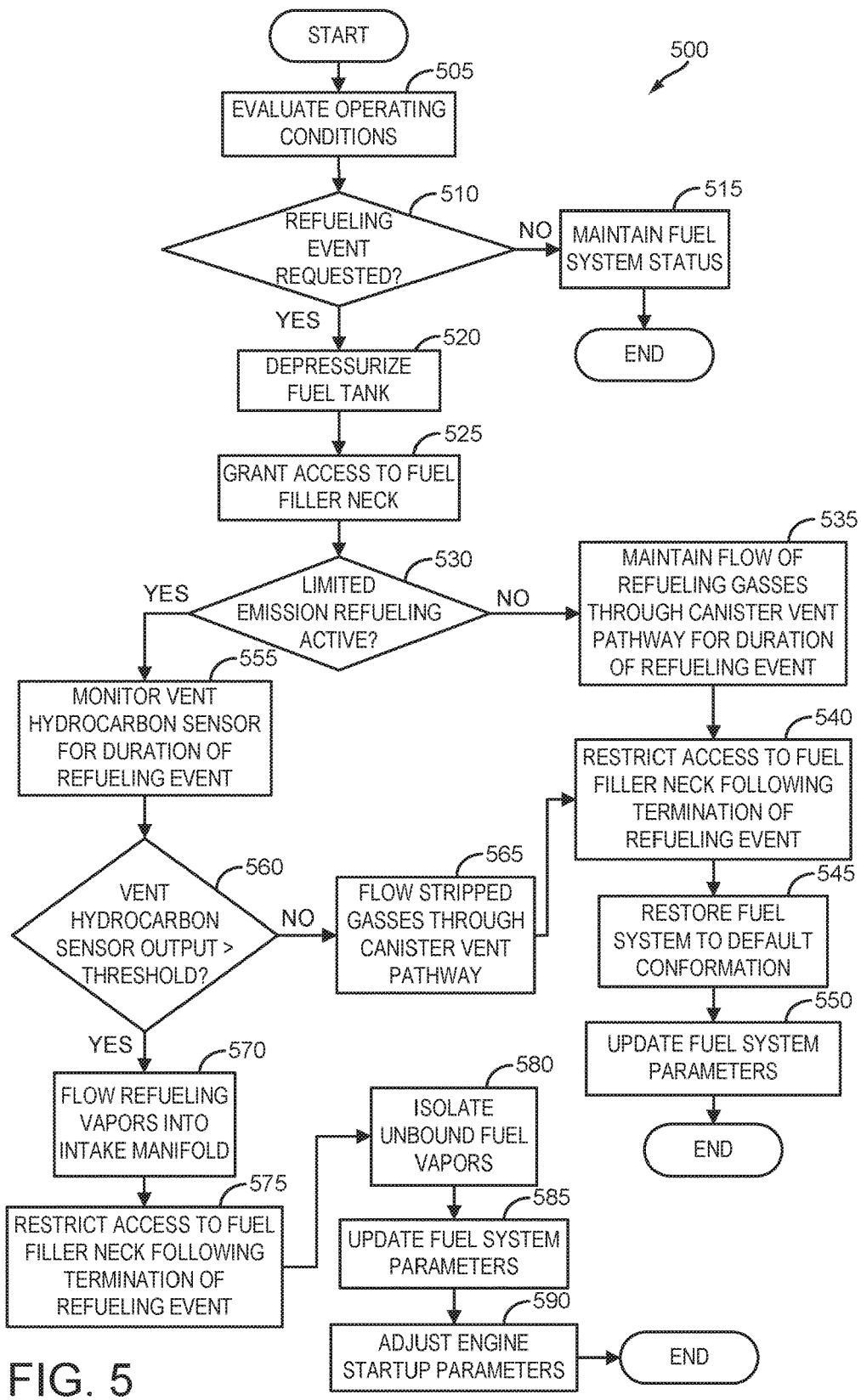
FIG. 5 shows an example method for detecting and mitigating hydrocarbon emissions during a refueling event.
Figure 6:
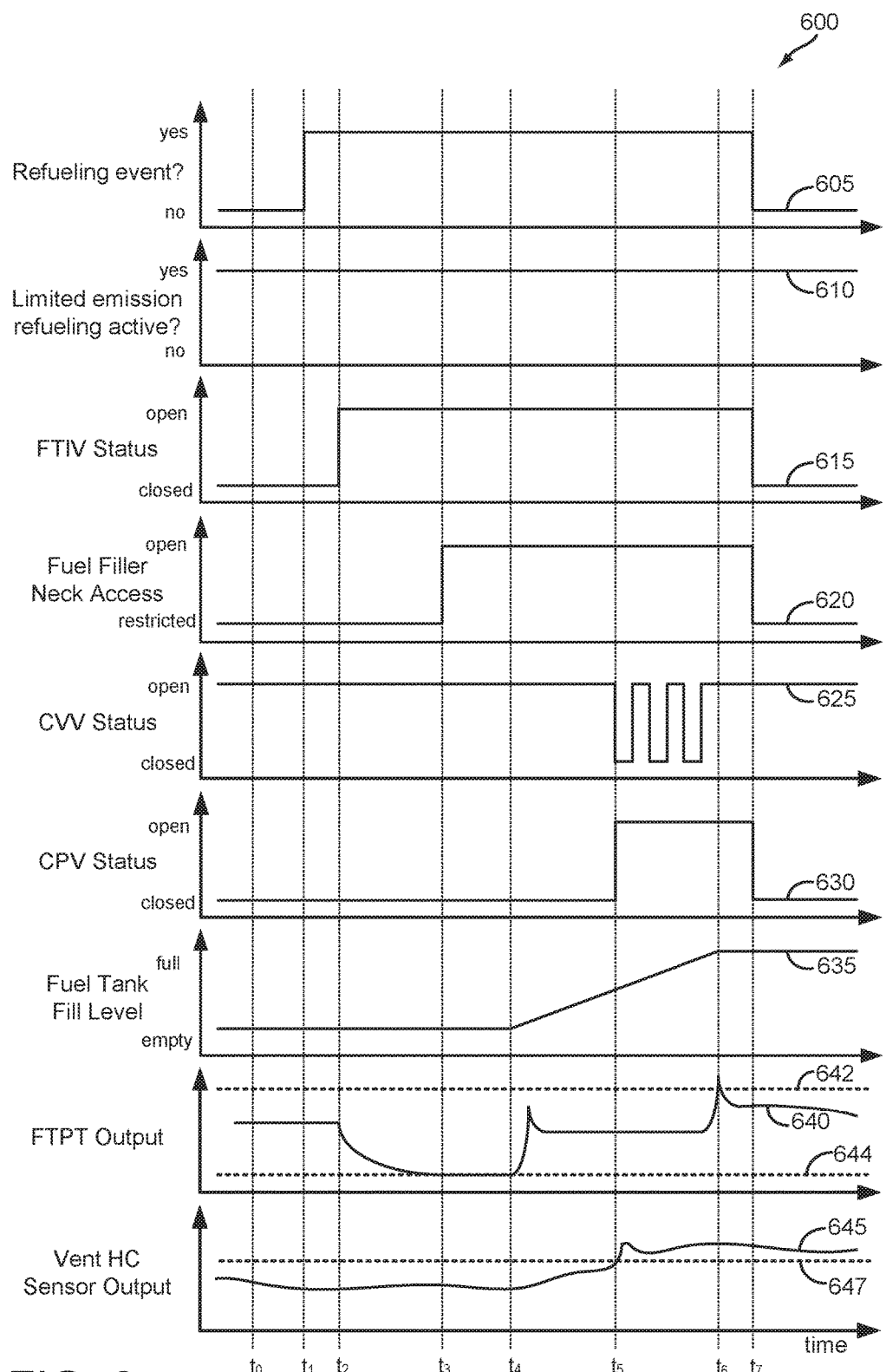
FIG. 6 shows a timeline for an example refueling event using the method of FIG. 5.

The following description relates to systems and methods for refueling a vehicle. More specifically, the description relates to system and methods for limiting fuel vapor emissions during a refueling event. In some jurisdictions, refueling emissions may be limited by local regulations. For example, a city or state may declare an ozone alert day where it is required to limit refueling in order to minimize the creation of ground ozone via emitted hydrocarbons. As such, a vehicle may be configured with a human-machine interface that allows a vehicle operator to request a refueling event, and to activate or override limited emissions refueling parameters. An example vehicle propulsion system and human machine interface is depicted in FIG. 1. The vehicle may comprise a liquid fuel tank and evaporative emissions system as depicted in FIG. 2. During certain conditions, the capacity of the fuel vapor canister may be insufficient to store the entirety of fuel vapor generated when filling a fuel tank. As such, a hydrocarbon sensor may be deposed in a canister vent pathway. If hydrocarbon breakthrough from the canister occurs while limited emissions refueling parameters are active, the canister vent pathway may be restricted by closing a valve, such as a fuel tank isolation valve or a canister vent valve, using a method such as the method shown in FIG. 3. A timeline for an example refueling event in accordance with the present disclosure is depicted in FIG. 4. In another example, the refueling vapors may be diverted to engine intake by opening a canister purge valve and duty-cycling a canister vent valve, using a method such as the method shown in FIG. 5. A timeline for an example refueling event in accordance with such an additional example of the present disclosure is depicted in FIG. 6. In some examples, a vehicle control system may execute method of each of the routines of FIGS. 3 and 5, but at different operating conditions.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130 (either directly, or via motor 120), where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 as indicated by arrow 125, which may in turn provide a generator function to convert the engine output to electrical energy, where the electrical energy may be stored at energy storage device 150 for later use by the motor. In some embodiments, motor 120 may be operated to rotate engine 110, as indicated by arrow 125. Generator 160 may also be operated to rotate engine 110 in addition to or as an alternative to motor 120. As an example, motor 120 may be operated as a starter motor by rotating engine 110 during a cold start operation. Motor 120 and/or generator 160 may rotate engine 110 without providing fuel to the engine for combustion. For example, during an electric-only mode of operation, rotating the engine may allow for a rotating transmission component to be maintained while adjusting the torque provided to drive wheels 130. In some scenarios, the engine may be rotated unfueled to generate intake vacuum without expending fuel.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 6, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 193 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication via human-machine interface 194.

Human-machine interface 194 may include a vehicle instrument panel 195. The vehicle instrument panel 195 may include indicator light(s) and/or a text-based display in which messages are displayed to an operator. In some embodiments, the vehicle instrument panel 195 may communicate audio messages to the operator with or without displaying a visual message. The vehicle instrument panel 195 may also include various input portions for receiving an operator input, such as buttons, touch screens, voice input/ recognition, etc. For example, the vehicle instrument panel 195 may include a refueling button 196 which may be manually actuated or pressed by a vehicle operator to initiate refueling. For example, as described in more detail below, in response to the vehicle operator actuating refueling button 196, a fuel tank in the vehicle may be depressurized so that refueling may be performed. Additional interfaces for HMI 194 including appropriate sensors and communication devices may be located at common points surrounding the vehicle frame, such as in proximity to a vehicle trunk, engine compartment, fuel filler neck, etc. These additional interfaces may enable a controller to output messages and/or notifications to a vehicle operator, refueling operator, mechanic, valet, etc. as well as receiving input from interface components external the primary vehicle cabin, so that an operator may receive from and transmit information to HMI 194 without being confined to the vehicle cabin. In some examples, a portable computing device, such as a smartphone, laptop computer, tablet computer, etc. may be used to interface with HMI 194, incorporating an application and interface at the portable computing device to facilitate communication.

In some examples, vehicle instrument panel 195 may include an ECO-mode selector switch 197. ECO-mode selector switch 197 may be utilized to activate or de-activate one or more routines, methods, and/or parameters for vehicle operation, engine operation, fuel system operation, and/or evaporative emissions system operation. When ECO-mode is selected, reducing vehicle emissions may be prioritized with a greater weight than during a "normal emissions" mode of operation. For example, a vehicle traversing a border between jurisdictions with differing emissions regulations standards may be required to activate ECO-mode upon entering the jurisdiction with more stringent standards. A given jurisdiction may invoke temporary emissions restrictions, such as an ozone alert day or smog alert day, which require vehicles to further limit emissions. In some embodiments, ECO-mode may be the default mode, thus requiring user input to activate a "normal emissions" mode. In some examples, the location of the vehicle may be determined via an on-board GPS or other tracking service, and the current location used to automatically determine whether to place the vehicle into ECO-mode. The vehicle operator may be enabled to override ECO-mode via ECO-mode selector switch 197 in certain conditions, such as during an emergency. In some embodiments, an ECO-mode selector switch or other components of HMI 194 may be located proximal to the fuel filler neck, allowing the vehicle operator to override ECO-mode from a location external the vehicle. For example, the vehicle operator may need to add more fuel during a refueling event than would be allowed otherwise in order to prevent running out of fuel in a sparsely populated area. As another example, peak engine efficiency may be relaxed in a scenario where the vehicle operator is en route to a hospital. Example methods for refueling a vehicle that has invoked ECO-mode are described herein and with regard to FIGS. 3 and 5.

The vehicle propulsion system 100 may also include an ambient temperature/humidity sensor 198, and a roll stability control sensor, such as a lateral and/or longitudinal and/or yaw rate sensor(s) 199. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst 270, which may be mounted in a close-coupled position in the exhaust. One or more emission control devices may include a three-way catalyst, lean $NO_x$ trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/ desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Such vent valves may be default-open valves which close responsive to fuel fill level, for example. In some embodiments, one or more of valves 283, 285, and 287 may be actuatable in order to increase or decrease the rate of fuel vapor flow through vapor recovery line 231 responsive to operating conditions. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222. A hydrocarbon sensor 229 may be deposed within vent line 227 between a fresh air port of canister 222 and canister vent valve 297. In this way, hydrocarbon breakthrough from canister 222 may be monitored.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 243. Other sensors such as pressure, temperature, air/fuel ratio, and composition sensors may be coupled to various locations in the vehicle system 206. As another example, the actuators may include throttle 262, fuel tank isolation valve 253, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines. Example control routines are described herein with regard to FIGS. 3 and 5.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. For example, an evaporative leak check module (not shown) may be coupled within vent line 227.

In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

As described with regard to FIG. 1, a vehicle may be operated in ECO-mode in order to limit running and/or evaporative emissions. When refueling in ECO-mode, limiting the emissions of hydrocarbon vapor may be prioritized over enabling the fuel fill level to reach a maximum fill level for the fuel tank. Thus, if a fuel vapor canister becomes saturated with hydrocarbons during the refueling process, the refueling event may be ended prior to the fill limit reaching the default maximum fill level. For example, a hot canister has a lower adsorption capacity than does a cool canister. In hot climates, and/or following a prolonged driving period, the canister temperature may become increased due to heat rejection from the engine, exhaust, asphalt radiation, etc. As such, the canister may be incapable of storing enough fuel vapor to accommodate a tank filling refueling event without emitting hydrocarbons into atmosphere.

Figure 3:
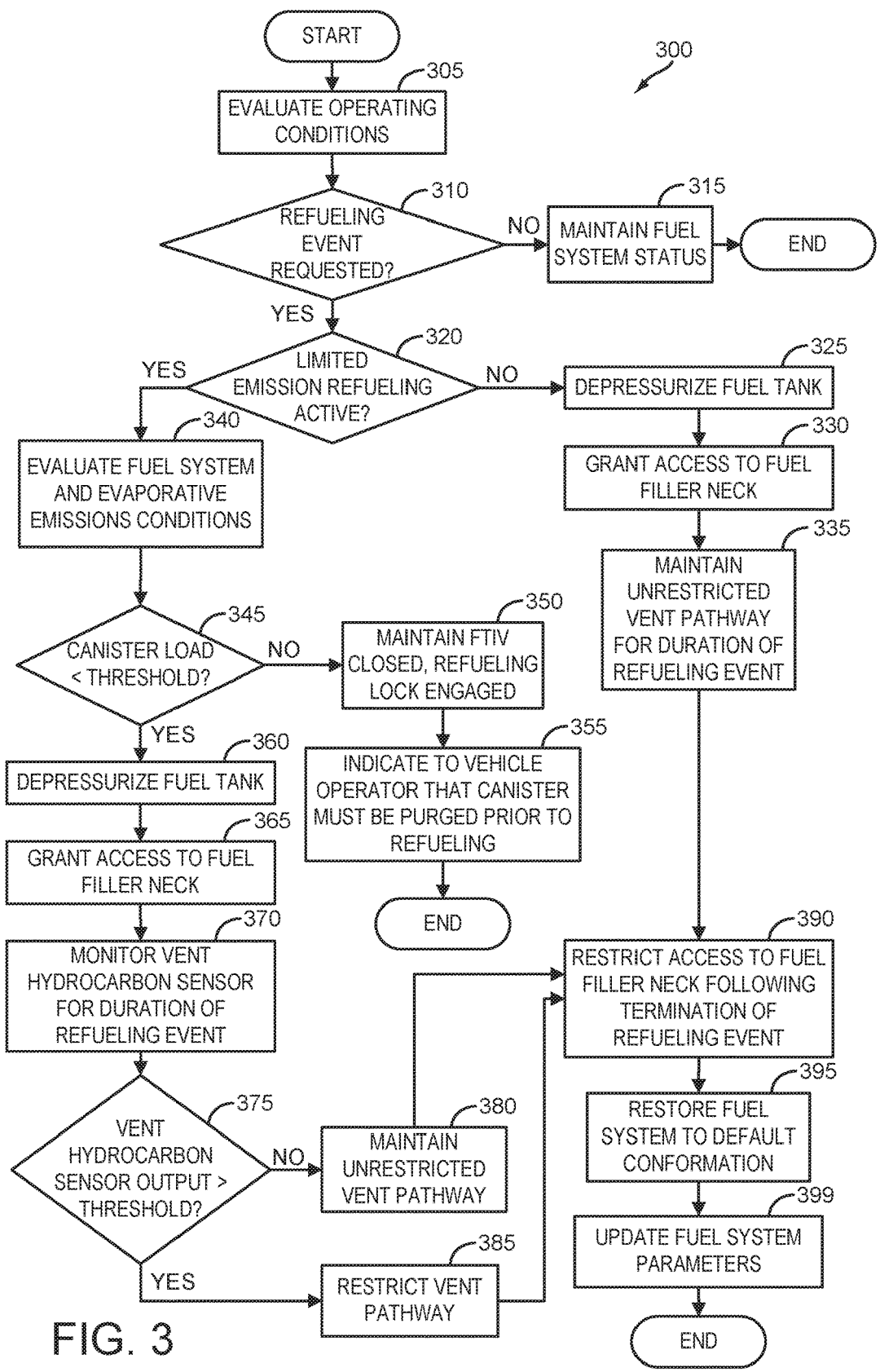
FIG. 3 shows an example method for detecting and mitigating hydrocarbon emissions during a refueling event.

A flow chart for an example high-level method 300 for a limited emissions refueling event is shown in FIG. 3. More specifically, method 300 may be utilized to automatically stop a refueling event responsive to detecting hydrocarbon breakthrough from a fuel vapor canister regardless of fuel fill level. Method 300 will be described with reference to the systems described herein and shown in FIGS. 1-2, though it should be understood that similar methods may be applied to other systems without departing from the scope of this disclosure. Method 300 may be carried out by a controller, such as controller 212 shown in FIG. 2, and may be stored at the controller as executable instructions in non-transitory memory.

Method 300 begins at 305 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 310, method 300 includes determining whether a refueling event has been requested. For example, a refueling event request may comprise a vehicle operator depression of a refueling button on a vehicle instrument panel in the vehicle (e.g., refueling button 196), or at a refueling door. In some examples, a refueling request may comprise a refueling operator requesting access to a fuel filler neck, for example, by attempting to open a refueling door, and/or attempting to remove a gas cap. If a refueling event has not been requested, the method 300 proceeds to 315, wherein method 300 includes maintaining the status of the fuel system, and may further include maintaining the status of the evaporative emissions system. For example, components such as the FTIV, CVV, CPV, fuel pump, and refueling lock may be signaled by the controller to maintain their current conformation and/or activity. Method 300 may then end.

If a request for refueling is received, method 300 proceeds to 320. At 320, method 300 includes determining whether limited emission refueling for the vehicle is activated. For example, as described with regard to FIG. 1, limited emission refueling may be activated when the vehicle is operating in ECO-mode. ECO-mode may be activated by default, based on the vehicle's location, local ambient conditions, local alerts, etc., and/or activated by the vehicle operator. For example, an ECO-mode selector switch (e.g., ECO-mode selector switch 197 depicted in FIG. 1) may be engaged to activate ECO-mode. If limited emission refueling is not active (car is operating in "normal emissions" mode and/or ECO-mode is overridden by the vehicle operator) method 300 proceeds to 325.

At 325, method 300 includes depressurizing the fuel tank. For example, the controller may open a fuel tank isolation valve (such as FTIV 252) and opening or maintaining open a vent path between the fuel vapor canister and atmosphere (e.g., open CVV 297 and/or place an ELCM changeover valve in a venting position), while maintaining a canister purge valve (e.g., CPV 261) closed, to depressurize the fuel tank before enabling fuel to be added therein. The fuel tank isolation valve may be opened in a manner to depressurize the fuel tank at a predetermined rate, so as to prevent rapid depressurization which may cause damage to fuel system components (e.g., FLVV and GVV, which may cork shut due to rapid depressurization). Depressurizing the fuel tank may include either decreasing a positive fuel tank pressure to atmospheric pressure and/or increasing a negative fuel tank pressure (fuel tank vacuum) to atmospheric pressure. An absolute value for fuel tank pressure (relative to atmospheric pressure) may thus be monitored during depressurization.

Continuing at 330, method 300 includes granting access to the fuel filler neck. A refueling lock, (e.g., refueling lock 245), may be maintained locked until the fuel tank pressure reaches a threshold pressure (e.g., atmospheric pressure), and then commanded to unlock, thus allowing access to the fuel filler neck only following fuel tank depressurization.

Continuing at 335, method 300 includes maintaining an unrestricted vent pathway for the duration of the refueling event. For example, the fuel tank isolation valve and canister vent path may be maintained open for the duration of the refueling event in order to allow refueling vapors to be flowed to the fuel vapor canister, and to allow gasses stripped of refueling vapors to be flowed to atmosphere.

Returning to 320, if limited emission refueling is active, then method 300 proceeds to 340. At 340, method 300 includes evaluating fuel system and evaporative emissions system conditions. Conditions may include canister load, canister temperature, fuel tank fill level, fuel tank pressure, fuel temperature, fuel composition, fuel RVP, etc. Continuing at 345, method 300 includes determining whether the canister load is below a threshold. The canister load threshold may be predetermined or based on current operating conditions. For example, the canister load threshold may represent whether the canister currently has the adsorption capacity to store the fuel vapor currently in the fuel tank along with an expected amount of fuel vapor generated while fuel is being added to the fuel tank. If the canister load is above the threshold, then method 300 proceeds to 350, and includes maintaining the FTIV closed and maintaining the refueling lock engaged. In other words, if it is determined that refueling is likely to lead to breakthrough emissions prior to the dispensation of a threshold quantity of fuel, the refueling event is prevented from proceeding.

Continuing at 355, method 300 includes indicating to the vehicle operator that the fuel vapor canister must be purged prior to refueling. For example, a message may be presented to the vehicle operator via a human-machine interface (HMI). The message may comprise visible and/or audible components. In some examples, additional instructions may be provided to activate the vehicle engine in order to generate intake vacuum which may be used to purge the fuel vapor canister. Additionally or alternatively, fuel vapor stored within the fuel tank may be purged to the engine for combustion to increase capacity of the canister to adsorb fuel vapor generated during fuel dispensation. For example, if the canister temperature is high and thus the adsorbance capacity of the canister is low, the canister load threshold indicated at 345 may be relatively low. Thus, reducing the amount of fuel vapor entrained to the fuel vapor canister during fuel tank depressurization may enable refueling while the vehicle is in ECO-mode. In some scenarios, the vehicle operator may be able to override ECO-mode thus allowing for refueling under "normal emissions" parameters, wherein threshold for canister hydrocarbon sensor output is increased or nullified, and/or limited emissions refueling parameters are designated as inactive. Method 300 may then end.

Returning to 345, if the fuel vapor canister load is below the threshold, method 300 then proceeds to 360. At 360, method 300 includes depressurizing the fuel tank, as described at 325. Continuing at 365, method 300 includes granting access to the fuel filler neck, as described at 330. Continuing at 370, method 300 includes monitoring the output of the vent hydrocarbon sensor (e.g., hydrocarbon sensor 229) for the duration of the refueling event. Monitoring the output of the vent hydrocarbon sensor may include receiving signals from one or more hydrocarbon sensors continuously, or at predetermined time intervals such that a predetermined number of vent hydrocarbon level measurements can be performed over the duration of the refueling event. The predetermined number of measurements and the predetermined time intervals may be set depending on a noise characteristic of the sensor and/or hydrocarbon level signal, for example. In one example, the predetermined time interval may be 5 seconds or 10 seconds, or frequent enough to collect a reliable number of measurements representative of the levels of hydrocarbon breakthrough typically observed during refueling. The end of the refueling event may be indicated based on one or more of the fuel tank pressure and fuel level. For example, the end of the refueling event may be indicated when a fuel level has plateaued for a duration, and when a fuel tank pressure has not increased over the plateau duration. In other examples, the end of the refueling event may be indicated responsive to a refueling nozzle being removed from the fuel filler neck, replacement of a fuel cap, closing of a refueling door, etc.

Continuing at 375, method 300 includes determining whether the output of the vent hydrocarbon sensor is greater than a threshold. The threshold may be predetermined or based on current operating conditions, and may represent a minimum amount of hydrocarbons in the canister vent line that can reliably be reported by the hydrocarbon sensor. In other words, the output of the hydrocarbon sensor may be monitored for breakthrough of hydrocarbons from the fuel vapor canister in to the canister vent line. If the vent hydrocarbon sensor output is below the threshold, method 300 proceeds to 380. At 380, method 300 includes maintaining an unrestricted canister vent pathway. For example, the FTIV and CVV may be maintained open.

If the vent hydrocarbon sensor output increases above the threshold, method 300 proceeds to 385. At 385, method 300 includes restricting the canister vent pathway. For example, the FTIV and/or CVV may be closed. In some embodiments, an ELCM changeover valve may be placed in a restricting conformation. In some embodiments, one or more fuel tank vent valves, such as an FLVV or GVV, may be commanded closed. By restricting the vent pathway, fuel vapor will build up behind the restricting valve, increasing the fuel tank pressure and thus triggering an automatic shutoff of the fuel dispenser. The technical result of restricting the vent pathway responsive to the output of a vent hydrocarbon sensor increasing above a threshold is that refueling emissions are mitigated. In some examples, the fuel system and/or evaporative emissions system may be backfilled with air and/or inert gas. For example, and ELCM pump located in the canister vent pathway may be activated to pump atmospheric air into the canister vent path. This may increase the rate of fuel tank pressure accumulation, hastening the automatic shutoff event. Further, backfilling may maintain the fuel tank pressure following the automatic shutoff event, decreasing the length of time before a subsequent automatic shutoff event following an attempt by the fuel dispenser operator to add additional fuel to (trickle fill) the fuel tank.

When the refueling event is stopped, either by automatic vent restriction due to fuel fill level, forced vent restriction due to hydrocarbon breakthrough, or refueling operator action, method 300 proceeds to 390. At 390, method 300 includes restricting access to the fuel filler neck following termination of the refueling event. Termination of the refueling event may be indicated by the withdrawal of a refueling nozzle from the fuel filler neck, replacement of a fuel cap, closing of a refueling door, etc. Restricting access to the fuel filler neck may include actuating the refueling lock. Continuing at 395, method 300 includes restoring the fuel system to a default conformation. For example, the FTIV may be closed, the CVV may be opened, and the CPV may be closed or maintained closed. Opening the CVV may be performed responsive to a vent hydrocarbon sensor output decreasing below a threshold. Continuing at 399, method 300 includes updating fuel system parameters. For example, the fuel fill level and canister load may be updated, a canister purge schedule may be updated, etc. Method 300 may then end.

FIG. 4 shows an example timeline 400 for a refueling event in accordance with the current disclosure. Timeline 400 includes plot 405, indicating whether a refueling event has been requested over time, and plot 410, indicating whether limited emission refueling parameters are active over time. Timeline 400 further includes plot 415, indicating the status of an FTIV over time; plot 420, indicating fuel filler neck access status over time; and plot 425, indicating the status of a CVV over time. Timeline 400 further includes plot 430, indicating fuel tank fill level over time, and plot 435, indicating an output of an FTPT over time. Line 436 represents a fuel tank pressure threshold above which a refueling nozzle will be triggered to cease dispensing fuel automatically. Line 438 represents a fuel tank pressure threshold for granting access to the fuel filler neck following fuel tank depressurization. Timeline 400 further includes plot 440, indicating an output of a vent hydrocarbon sensor over time. Line 441 represents a threshold hydrocarbon concentration for indicating hydrocarbon breakthrough from a fuel vapor canister.

At time $t_0$, no refueling event has been requested, as indicated by plot 405. As such, the FTIV is closed, as indicated by plot 415, fuel filler neck access is restricted, as indicated by plot 420, and the CVV is open, as indicated by plot 425. At time $t_1$, a refueling request is received. Accordingly, the FTIV is opened at time $t_2$, while the CVV is maintained open, and fuel filler neck access is maintained restricted. In response to opening the FTIV, the fuel tank pressure decreases, as shown by plot 435. Although fuel vapor is being vented from the fuel tank, the output of the vent hydrocarbon sensor does not significantly increase, indicating that the fuel vapor canister is adsorbing the vented hydrocarbons, and releasing gasses stripped of hydrocarbons into the canister vent pathway.

At time $t_3$, the output of the FTPT decreases to the threshold represented by line 438. Accordingly, fuel filler neck access is granted, while the FTIV and CVV are maintained in open conformations. At time $t_4$, fuel dispensation is initiated. The fuel tank pressure undergoes an initial pressure rise and then decreases to a steady-state pressure that is proportional to the flow rate of fuel dispensed in to the fuel tank. The fuel tank fill level increases linearly from time $t_4$ until time $t_5$. At time $t_5$, the vent hydrocarbon sensor output increases above the threshold represented by line 441, indicating hydrocarbon breakthrough from the canister into the canister vent. As limited emission refueling is active, as indicated by plot 410, the CVV is closed in order to prevent further hydrocarbon emission. Closing the CVV blocks the flow of fuel vapor out of the fuel tank, increasing the fuel tank pressure above the threshold represented by line 436. The rise in fuel tank pressure causes an automatic shut-off signal to be sent to the fuel dispenser. Accordingly, the fuel dispenser is shut off at time $t_5$. Fuel dispensing ceases and the fuel tank fill level levels off.

From time $t_6$ to time $t_7$, the fuel dispenser operator attempts to trickle-fill additional fuel in the fuel tank. Accordingly, fuel tank pressure increases, as shown by plot 435, although a minimal amount of fuel is added to the tank, as shown by plot 430. At time $t_7$, another automatic shut-off event occurs. The fuel level again stops increasing, and the fuel tank pressure decreases slightly. Another trickle-filling event followed by an automatic shut-off event occurs from time $t_8$ to time $t_9$. Following time $t_9$, the fuel tank pressure decreases, as shown by plot 435. The refueling event is then finalized. At time $t_{10}$, fuel filler neck access is restricted, and the FTIV is closed. Closing the FTIV limits the amount of fuel vapor within the fuel vapor canister and canister vent line. Additional fuel vapor is adsorbed by the canister, and the hydrocarbon concentration in the canister vent decreases, as indicated by plot 440. At time $t_{11}$, the vent hydrocarbon sensor output decreases below the threshold represented by line 441. Accordingly, the CVV is returned to an open conformation.

While the method described with regard to FIG. 3 limits emissions during refueling events, filling a fuel tank following canister breakthrough may be challenging if the canister vent pathway is restricted in this way. A flow chart for an example high-level method 500 for a limited emissions refueling event that does not limit fuel fill level is shown in FIG. 5. More specifically, method 500 may be utilized to divert refueling vapors into the intake manifold of a vehicle responsive to hydrocarbon breakthrough from a fuel vapor canister. Method 500 will be described with reference to the systems described herein and shown in FIGS. 1-2, though it should be understood that similar methods may be applied to other systems without departing from the scope of this disclosure. Method 500 may be carried out by a controller, such as controller 212 shown in FIG. 2, and may be stored at the controller as executable instructions in non-transitory memory.

Method 500 begins at 505 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 510, method 500 includes determining whether a refueling event has been requested. For example, a refueling event request may comprise a vehicle operator depression of a refueling button on a vehicle instrument panel in the vehicle (e.g., refueling button 196), or at a refueling door. In some examples, a refueling request may comprise a refueling operator requesting access to a fuel filler neck, for example, by attempting to open a refueling door, and/or attempting to remove a gas cap. If a refueling event has not been requested, the method 500 proceeds to 515, wherein method 500 includes maintaining the status of the fuel system, and may further include maintaining the status of the evaporative emissions system. For example, components such as the FTIV, CVV, CPV, fuel pump, and refueling lock may be signaled by the controller to maintain their current conformation and/or activity. Method 500 may then end.

If a refueling event has been requested, method 500 proceeds to 520. At 520, method 500 includes depressurizing the fuel tank. For example, the controller may open a fuel tank isolation valve (such as FTIV 252) and opening or maintaining open a vent path between the fuel vapor canister and atmosphere (e.g., open CVV 297 and/or place an ELCM changeover valve in a venting position), while maintaining a canister purge valve (e.g., CPV 261) closed, to depressurize the fuel tank before enabling fuel to be added therein. The fuel tank isolation valve may be opened in a manner to depressurize the fuel tank at a predetermined rate, so as to prevent rapid depressurization which may cause damage to fuel system components (e.g., FLVV and GVV, which may cork shut due to rapid depressurization). Depressurizing the fuel tank may include either decreasing a positive fuel tank pressure to atmospheric pressure and/or increasing a negative fuel tank pressure (fuel tank vacuum) to atmospheric pressure. An absolute value for fuel tank pressure (relative to atmospheric pressure) may thus be monitored during depressurization.

Continuing at 525, method 500 includes granting access to the fuel filler neck. A refueling lock, (e.g., refueling lock 245), may be maintained locked until the fuel tank pressure reaches a threshold pressure (e.g., atmospheric pressure), and then commanded to unlock, thus allowing access to the fuel filler neck only following fuel tank depressurization.

Continuing at 530, method 500 includes determining whether limited emission refueling for the vehicle is activated. For example, as described with regard to FIG. 1, limited emission refueling may be activated when the vehicle is operating in ECO-mode. ECO-mode may be activated by default, based on the vehicle's location, local ambient conditions, local alerts, etc., and/or activated by the vehicle operator. For example, an ECO-mode selector switch (e.g., ECO-mode selector switch 197 depicted in FIG. 1) may be engaged to activate ECO-mode. If limited emission refueling is not active (car is operating in "normal emissions" mode and/or ECO-mode is overridden by the vehicle operator, method 500 proceeds to 535.

At 535, method 500 includes maintaining the flow of refueling gasses through the canister vent pathway for the duration of the refueling event. As fuel is added to the fuel tank, refueling vapors are generated. The refueling vapors are ported to the fuel vapor canister, where hydrocarbons are adsorbed there within. Gasses stripped of fuel vapor may then exit the fuel vapor canister. Maintaining the flow of refueling gasses through the canister vent pathway may include maintaining an FTIV (or VBV) open, maintaining a CPV closed, and maintaining a CVV open or otherwise maintaining a coupling the vent port of the canister to atmosphere. At the end of the refueling event, the FTIV may be closed and the CVV and CPV may be operated under default logic.

When the refueling event is stopped, either by automatic vent restriction due to fuel fill level, refueling operator action or by other means, method 500 then proceeds to 540. At 540, method 500 includes restricting access to the fuel filler neck following termination of the refueling event.

Termination of the refueling event may be indicated by the withdrawal of a refueling nozzle from the fuel filler neck, replacement of a fuel cap, closing of a refueling door, etc. Restricting access to the fuel filler neck may include actuating the refueling lock. Continuing at 545, method 500 includes restoring the fuel system to a default conformation. For example, the FTIV may be closed, the CVV may be opened, and the CPV may be closed or maintained closed. Opening the CVV may be performed responsive to a vent hydrocarbon sensor output decreasing below a threshold. Continuing at 550, method 500 includes updating fuel system parameters. For example, the fuel fill level and canister load may be updated, a canister purge schedule may be updated, etc. Method 500 may then end.

Returning to 530, if limited emission refueling is active, then method 500 proceeds to 555. At 555, method 500 includes monitoring the output of the vent hydrocarbon sensor (e.g., hydrocarbon sensor 229) for the duration of the refueling event. Monitoring the output of the vent hydrocarbon sensor may include receiving signals from one or more hydrocarbon sensors continuously or at predetermined time intervals such that a predetermined number of vent hydrocarbon level measurements can be performed over the duration of the refueling event. The predetermined number of measurements and the predetermined time intervals may be set depending on a noise characteristic of the sensor and/or hydrocarbon level signal, for example. In one example, the predetermined time interval may be 5 seconds or 10 seconds, or frequent enough to collect a reliable number of measurements representative of the levels of hydrocarbon breakthrough typically observed during refueling. The end of the refueling event may be indicated based on one or more of the fuel tank pressure and fuel level. For example, the end of the refueling event may be indicated when a fuel level has plateaued for a duration, and when a fuel tank pressure has not increased over the plateau duration. In other examples, the end of the refueling event may be indicated responsive to a refueling nozzle being removed from the fuel filler neck, replacement of a fuel cap, closing of a refueling door, etc.

Continuing at 560, method 500 includes determining whether the output of the vent hydrocarbon sensor is greater than a threshold. The threshold may be predetermined or based on current operating conditions, and may represent a minimum amount of hydrocarbons in the canister vent line that can reliably be reported by the hydrocarbon sensor. In other words, the output of the hydrocarbon sensor may be monitored for breakthrough of hydrocarbons from the fuel vapor canister in to the canister vent line. If the vent hydrocarbon sensor output is below the threshold, method 500 proceeds to 565. At 565, method 500 includes flowing gasses stripped of fuel vapor through the canister vent pathway. For example, the FTIV and CVV may be maintained open, while the CPV is maintained closed. Method 500 may then proceed to 540, and include restricting access to the fuel filler neck following the termination of the refueling event as described above.

Returning to 560, if the vent hydrocarbon sensor output increases above the threshold, then method 500 proceeds to 570. At 570, method 500 includes flowing refueling vapors into the vehicle intake manifold. As an example, the CPV may be opened, while the CVV may be duty cycled so that the path through the canister purge port is less restrictive than the path through the canister vent port. In this way, fuel vapor that is not bound to the canister adsorbent is directed to the intake manifold, rather than to atmosphere. Unlike the method described with regard to FIG. 3, the redirection of the fuel vapor does not automatically build pressure that would result in the cessation of fuel dispensation, thus allowing for the fuel tank to be filled. In some examples, the intake throttle may be closed or maintained closed. Further, in some examples, the intake and/or exhaust valves of one or more engine cylinders may be closed or maintained closed.

Continuing at 575, method 500 includes restricting access to the fuel filler neck following termination of the refueling event. Termination of the refueling event may be indicated by the withdrawal of a refueling nozzle from the fuel filler neck, replacement of a fuel cap, closing of a refueling door, etc. Restricting access to the fuel filler neck may include actuating the refueling lock.

Continuing at 580, method 500 includes isolating unbound fuel vapors. This may include closing an FTIV to isolate fuel vapor in the fuel tank, may further include closing a CPV to isolate fuel vapor within the intake manifold, and may further include closing a CVV to isolate fuel vapor within the canister vent pathway. Continuing at 585, method 500 includes updating fuel system parameters. For example, the fuel fill level and canister load may be updated, a canister purge schedule may be updated, etc. Continuing at 590, method 500 includes updating engine startup parameters. For example, engine fueling controls and A/F ratios may be adjusted to reduce the quantity of fuel injected at engine startup based on the amount of fuel vapor within the engine intake system. For hybrid vehicles, start-stop vehicles, and other vehicles that may not startup an engine at key-on, the parameters governing engine startup may be adjusted in order to prevent operating the vehicle with fuel vapor trapped in the intake. For example, engine startup may be earlier and/or with reduced thresholds as compared to key-on events where the intake manifold is not holding fuel vapor. Method 500 may then end.

In some examples, a refueling method may comprise elements of both method 300 and method 500. For example, if a fuel fill level is above a threshold, hydrocarbon emissions may be limited by restricting a canister vent pathway, while hydrocarbon emissions may be limited by diverting refueling vapors to the engine intake if a fuel fill level is below the threshold. Similar logic may be applied based on battery charge, distance to next fueling station on a programmed trip, etc. In some examples, a canister vent pathway may initially be restricted based on hydrocarbon breakthrough, then refueling vapors may be diverted to the engine intake following a threshold number of trickle-fill attempts. In this way, emissions may be restricted while allowing for increased fuel fill level in some scenarios.

FIG. 6 shows an example timeline 600 for a refueling event in accordance with the current disclosure. Timeline 600 includes plot 605, indicating whether a refueling event has been requested over time, and plot 610, indicating whether limited emission refueling parameters are active over time. Timeline 600 further includes plot 615, indicating the status of an FTIV over time; plot 620, indicating fuel filler neck access status over time; and plot 625, indicating the status of a CVV over time. Timeline 400 further includes plot 630, indicating the status of a CPV over time, plot 635, indicating fuel tank fill level over time, and plot 640, indicating an output of an FTPT over time. Line 642 represents a fuel tank pressure threshold above which a refueling nozzle will be triggered to cease dispensing fuel automatically. Line 644 represents a fuel tank pressure threshold for granting access to the fuel filler neck following fuel tank depressurization. Timeline 600 further includes plot 645, indicating an output of a vent hydrocarbon sensor over time. Line 647 represents a threshold hydrocarbon concentration for indicating hydrocarbon breakthrough from a fuel vapor canister.

At time $t_0$, no refueling event has been requested, as indicated by plot 605. As such, the FTIV is closed, as indicated by plot 615, fuel filler neck access is restricted, as indicated by plot 620, the CVV is open, as indicated by plot 625, and the CPV is closed, as indicated by plot 630. At time $t_1$, a refueling request is received. Accordingly, the FTIV is opened at time $t_2$, while the CVV is maintained open, the CPV is maintained closed, and fuel filler neck access is maintained restricted. In response to opening the FTIV, the fuel tank pressure decreases, as shown by plot 640. Although fuel vapor is being vented from the fuel tank, the output of the vent hydrocarbon sensor does not significantly increase, indicating that the fuel vapor canister is adsorbing the vented hydrocarbons, and releasing gasses stripped of hydrocarbons into the canister vent pathway.

At time $t_3$, the output of the FTPT decreases to the threshold represented by line 644. Accordingly, fuel filler neck access is granted, while the FTIV and CVV are maintained in open conformations, and the CPV is maintained in a closed conformation. At time $t_4$, fuel dispensation is initiated. The fuel tank pressure undergoes an initial pressure rise and then decreases to a steady-state pressure that is proportional to the flow rate of fuel dispensed in to the fuel tank. At time $t_5$, the vent hydrocarbon sensor output increases above the threshold represented by line 647, indicating hydrocarbon breakthrough from the canister into the canister vent. As limited emission refueling is active, as indicated by plot 610, the CPV is opened, and the CVV is duty-cycled between and open and closed position. Accordingly, the fuel tank fill level continues to rise linearly, and the fuel tank pressure is maintained relatively constant.

At time $t_6$, the fuel tank fill level reaches a full fill level, and the fuel tank pressure increases above the threshold represented by line 642. The rise in fuel tank pressure causes an automatic shut-off signal to be sent to the fuel dispenser. Accordingly, the fuel dispenser is shut off at time $t_6$. Fuel dispensing ceases and the fuel tank fill level levels off. At time $t_7$, the FTIV is closed, the CPV is closed, the CVV is maintained in an open conformation, and fuel filler neck access is restricted.

The systems described herein and with reference to FIGS. 1 and 2, along with the methods described herein and with reference to FIGS. 3 and 5 may enable one or more systems and one or more methods. In one example, a method is presented, comprising: during a first condition, including an ongoing refueling event, receiving an indication of hydrocarbon breakthrough from a fuel vapor canister; and flowing refueling vapors into an intake manifold responsive to the indication of hydrocarbon breakthrough. The technical result of implementing this method is that refueling emissions stemming from canister breakthrough can be mitigated, while allowing the continuation of the refueling event. Such an example method may additionally or alternatively comprise updating one or more engine startup parameters following termination of the refueling event. In any of the preceding example methods, the one or more fuel system parameters may additionally or alternatively comprise a fuel injection quantity. In any of the preceding example methods, flowing refueling vapors into an intake manifold may additionally or alternatively comprise opening a canister purge valve coupled between a fuel vapor canister and the intake manifold. In any of the preceding example methods, flowing refueling vapors into an intake manifold further may additionally or alternatively comprise duty-cycling a canister vent valve coupled between the fuel vapor canister and atmosphere. In any of the preceding example methods, the method may additionally or alternatively comprise isolating unbound fuel vapors following termination of the refueling event. In any of the preceding example methods, isolating unbound fuel vapors may additionally or alternatively comprise closing the canister purge valve. In any of the preceding example methods, the indication of hydrocarbon breakthrough from the fuel vapor canister may additionally or alternatively comprise an output of a hydrocarbon sensor coupled within the fuel vapor canister vent pathway increasing above a threshold. In any of the preceding example methods, the method may additionally or alternatively comprise receiving a request for a refueling event; opening a fuel tank isolation valve coupled between a fuel and a fuel vapor canister; and removing access restrictions to a fuel filler neck responsive to an absolute fuel tank pressure decreasing below a threshold. In any of the preceding example methods, the first condition may additionally or alternatively comprise active limited emission refueling parameters. In any of the preceding example methods, limited emission refueling parameters may additionally or alternatively be activated in response to a local regulation for the jurisdiction in which the refueling event takes place. In any of the preceding example methods, the method may additionally or alternatively comprise during a second condition, including an active refueling event, restricting flow of refueling vapors into the intake manifold regardless of an indication of hydrocarbon breakthrough, including even when the indication of breakthrough is generated. In any of the preceding example methods, the limited emission refueling parameters may additionally or alternatively be inactive during the second condition.

In another example, a fuel system for a vehicle is presented, comprising: a fuel vapor canister vent pathway comprising a load conduit coupled to a fuel tank and a vent conduit coupled to atmosphere; one or more valves coupled within the fuel vapor canister vent pathway; a fuel vapor canister purge pathway comprising a purge conduit coupled between a fuel vapor canister and an engine intake; a canister purge valve coupled within the fuel vapor canister purge pathway; a hydrocarbon sensor coupled within the vent conduit; a purge conduit coupled between the fuel vapor canister; a human machine interface configured to receive a refueling request from a vehicle operator and further configured to receive input from the vehicle operator indicating whether limited emissions refueling parameters are active; and a controller configured with instructions stored in non-transitory memory, that when executed, cause the controller to: depressurize the fuel tank via the fuel vapor canister vent pathway responsive to an indication that a refueling request has been received by the human machine interface; responsive to an indication that limited emissions refueling parameters are active, monitor an output of the hydrocarbon sensor during a refueling event; and flow refueling vapors into the intake manifold via the fuel vapor canister purge conduit responsive to the output of the hydrocarbon sensor increasing above a threshold. The technical effect of implementing this system is a reduction in ground ozone during refueling events. In such an example fuel system the one or more valves coupled within the fuel vapor canister vent pathway may additionally or alternatively include a canister vent valve coupled between the fuel vapor canister and atmosphere, and wherein flow refueling vapors into the intake manifold via the fuel vapor canister purge conduit comprises opening the canister purge valve and duty-cycling the canister vent valve. In any of the preceding example fuel systems, the controller may additionally or alternatively be further configured with instructions stored in non-transitory memory, that when executed, cause the controller to: flow refueling vapors through the fuel vapor canister vent pathway based on an output of the hydrocarbon sensor below the threshold.

In yet another example, a method for an evaporative emissions system is presented, comprising: receiving a request for a refueling event; receiving an indication that limited emissions refueling parameters are active; venting a fuel tank to atmosphere via a fuel vapor canister; allowing access to a fuel filler neck responsive to an absolute fuel tank pressure decreasing below a threshold; monitoring an output of a hydrocarbon sensor coupled between the fuel vapor canister and atmosphere; and during a first condition, responsive to the output of the hydrocarbon sensor increasing above a threshold, reducing the resistance of vapor flow through a fuel vapor canister purge pathway relative to the resistance of vapor flow through a fuel vapor canister vent pathway. The technical effect of implementing this method is an increase in the amount of fuel vapor that can be handled by an evaporative emissions system during a refueling event. Such an example method may additionally or alternatively comprise during a second condition, responsive to the output of the hydrocarbon sensor increasing above a threshold, restricting vapor flow through both the fuel vapor canister purge pathway and the fuel vapor canister vent pathway. In any of the preceding example methods, the first condition may additionally or alternatively comprise a fuel tank fill level below a threshold, and the second condition may additionally or alternatively comprise a fuel tank fill level above the threshold. In any of the preceding example methods, the first condition may additionally or alternatively follow the second condition, and the first condition may additionally or alternatively follow a number of trickle-fill attempts greater than a threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
   during a first condition, including an ongoing refueling event where a fuel filler neck is accessible, receiving an indication of hydrocarbon breakthrough from a fuel vapor canister; and
   flowing refueling vapors into an intake manifold and maintaining access to the fuel filler neck responsive to the indication of hydrocarbon breakthrough, the refueling vapors trapped in the intake manifold until an engine start-up.

2. The method of claim 1, further comprising:
   updating one or more engine start-up parameters following termination of the refueling event based on the refueling vapors trapped in the intake manifold.

3. The method of claim 2, wherein the one or more engine start-up parameters comprise a fuel injection quantity at the engine start-up.

4. The method of claim 1, wherein flowing refueling vapors into the intake manifold comprises opening a canister purge valve coupled between the fuel vapor canister and the intake manifold.

5. The method of claim 4, wherein flowing refueling vapors into the intake manifold further comprises duty-cycling a canister vent valve coupled between the fuel vapor canister and atmosphere.

6. The method of claim 4, further comprising isolating unbound fuel vapors following termination of the refueling event.

7. The method of claim 6, wherein isolating unbound fuel vapors comprises closing the canister purge valve.

8. The method of claim 1, wherein the indication of hydrocarbon breakthrough from the fuel vapor canister comprises an output of a hydrocarbon sensor coupled within a fuel vapor canister vent pathway, between a fresh air port and a canister vent valve, increasing above a threshold.

9. The method of claim 1, further comprising:
   receiving a request for a refueling event;
   responsive to the request, depressurizing a fuel tank by opening a fuel tank isolation valve coupled between a fuel and the fuel vapor canister while maintaining access restrictions to the fuel filler neck; and
   granting access to the fuel filler neck responsive to an absolute fuel tank pressure decreasing below a threshold.

10. The method of claim 9, wherein the first condition comprises limited emission refueling parameters being activated.

11. The method of claim 10, further comprising:
during a second condition, including an active refueling event, restricting flow of refueling vapors into the intake manifold regardless of the indication of hydrocarbon breakthrough, including even when the indication of hydrocarbon breakthrough is generated.

12. The method of claim 11, wherein the limited emission refueling parameters are inactive during the second condition.

13. A fuel system for a vehicle, comprising:
a fuel vapor canister vent pathway comprising a load conduit coupled to a fuel tank and a vent conduit coupled to atmosphere;
one or more valves coupled within the fuel vapor canister vent pathway;
a fuel vapor canister purge pathway comprising a purge conduit coupled between a fuel vapor canister and an engine intake manifold;
a canister purge valve coupled within the fuel vapor canister purge pathway;
a hydrocarbon sensor coupled within the vent conduit;
an interface configured to receive a refueling request from a vehicle operator and further configured to receive input from the vehicle operator indicating whether limited emission refueling parameters are active; and
a controller configured with instructions stored in non-transitory memory that, when executed, cause the controller to:
depressurize the fuel tank via the fuel vapor canister vent pathway responsive to an indication that the refueling request has been received by the interface;
responsive to an indication that limited emission refueling parameters are active, monitor an output of the hydrocarbon sensor during a refueling event in which a fuel filler neck is accessible; and
flow refueling vapors into the engine intake manifold via the purge conduit responsive to the output of the hydrocarbon sensor increasing above a threshold while maintaining access to the fuel filler neck, the refueling vapors trapped in the engine intake manifold until an engine start-up following the refueling event.

14. The fuel system of claim 13, wherein the hydrocarbon sensor is coupled within the vent conduit between a fresh air port and a canister vent valve, wherein the one or more valves coupled within the fuel vapor canister vent pathway includes the canister vent valve coupled between the fuel vapor canister and atmosphere, and wherein flowing refueling vapors into the engine intake manifold via the purge conduit comprises opening the canister purge valve and duty-cycling the canister vent valve.

15. The fuel system of claim 13, where the controller is further configured with instructions stored in non-transitory memory that, when executed, cause the controller to:
flow the refueling vapors through the fuel vapor canister vent pathway based on the output of the hydrocarbon sensor below the threshold.

16. A method for an evaporative emissions system, comprising:
receiving a request for a refueling event;
receiving an indication that limited emission refueling parameters are active;
venting a fuel tank to atmosphere via a fuel vapor canister;
allowing access to a fuel filler neck responsive to an absolute fuel tank pressure decreasing below a threshold;
monitoring an output of a hydrocarbon sensor coupled between the fuel vapor canister and atmosphere; and
during a first condition where the refueling event is ongoing, responsive to the output of the hydrocarbon sensor increasing above a threshold, maintaining access to the fuel filler neck and reducing a resistance of vapor flow through a fuel vapor canister purge pathway relative to a resistance of vapor flow through a fuel vapor canister vent pathway to trap refueling vapors in an engine intake manifold until an engine start-up.

17. The method of claim 16, further comprising:
during a second condition, responsive to the output of the hydrocarbon sensor increasing above the threshold, restricting vapor flow through both the fuel vapor canister purge pathway and the fuel vapor canister vent pathway.

18. The method of claim 17, wherein the first condition comprises a fuel tank fill level below a threshold, and the second condition comprises the fuel tank fill level above the threshold.

19. The method of claim 17, wherein the first condition follows the second condition, and wherein the first condition further follows a number of trickle-fill attempts greater than a threshold.

* * * * *